(12) United States Patent
Suh et al.

(10) Patent No.: US 8,036,232 B2
(45) Date of Patent: Oct. 11, 2011

(54) APPARATUS AND METHOD FOR FILTERING PACKET IN A NETWORK SYSTEM USING MOBILE IP

(75) Inventors: Kyung-Joo Suh, Seoul (KR); Dae-Gyun Kim, Seongnam-si (KR); Beom-Sik Bae, Suwon-si (KR); Yeon-Ju Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1082 days.

(21) Appl. No.: 11/843,117

(22) Filed: Aug. 22, 2007

(65) Prior Publication Data

US 2008/0049679 A1    Feb. 28, 2008

(30) Foreign Application Priority Data

Aug. 22, 2006 (KR) .................. 10-2006-0079433

(51) Int. Cl.
*H04L 12/56* (2006.01)
(52) U.S. Cl. .............................. 370/401; 726/13
(58) Field of Classification Search .................... None
See application file for complete search history.

(56) References Cited

U.S. PATENT DOCUMENTS

| | | | |
|---|---|---|---|
| 7,385,946 B2 * | 6/2008 | Devarapalli et al. ......... 370/328 |
| 7,620,979 B2 * | 11/2009 | Hippelainen .................. 726/11 |
| 2004/0120295 A1 | 6/2004 | Liu et al. |
| 2005/0135241 A1 | 6/2005 | Hippelainen |
| 2005/0165917 A1 * | 7/2005 | Le et al. ........................ 709/220 |
| 2005/0175002 A1 * | 8/2005 | Le et al. ........................ 370/389 |
| 2006/0104284 A1 * | 5/2006 | Chen .......................... 370/395.3 |
| 2007/0039044 A1 * | 2/2007 | Moonen ........................ 726/13 |
| 2007/0067838 A1 * | 3/2007 | Bajko ............................. 726/11 |
| 2007/0091862 A1 * | 4/2007 | Ioannidis ..................... 370/338 |
| 2008/0072279 A1 * | 3/2008 | Miao et al. ....................... 726/1 |
| 2009/0010271 A1 * | 1/2009 | Bachmann et al. ........... 370/401 |

OTHER PUBLICATIONS

Le, et al., "MobileIPv6 and Firewalls: Problem Statement", Network Working Group, RFC 4487, May 2006.

* cited by examiner

*Primary Examiner* — Min Jung
(74) *Attorney, Agent, or Firm* — The Farrell Law Firm, P.C.

(57) ABSTRACT

A packet filtering apparatus for filtering a packet transmitted from a mobile node to a correspondent node in a network system using Mobile Internet Protocol (IP). The packet filtering apparatus includes a next header reader for reading a next header of the received packet to determine whether it is a mobility header, a mobility header type reader for reading a mobility header type when the next header is the mobility header, a mobility option reader for reading a mobility option added by the mobile node, and a packet rule applier for determining whether a home address included in the mobility option read by the mobility option reader is identical to a source address stored in a packet filter rule, and determining whether to pass the packet according to the determination result.

31 Claims, 11 Drawing Sheets

APPARATUS AND METHOD FOR FILTERING PACKET IN A NETWORK SYSTEM USING MOBILE IP

PRIORITY

This application claims priority under 35 U.S.C. §119(a) to a Korean Patent Application filed in the Korean Intellectual Property Office on Aug. 22, 2006 and assigned Ser. No. 2006-79433, the contents of which are incorporated herein by reference.

BACKGROUND OF THE INVENTION

1. Field of the Invention

The present invention relates generally to a network system using Mobile Internet Protocol (IP), and in particular, to an apparatus and method for filtering packets in a network system using Mobile IP.

2. Description of the Related Art

Due to the progress of the Internet technology, there has been a rapid increase in the development of IP communication networks. In these IP communication networks, users and a particular server operate with their fixed addresses, or IP addresses, and routing is achieved based on the addresses.

Similarly, in the mobile communication system, several schemes have been proposed to provide more data to mobile terminals. The so-called Mobile IP concept of allocating IP addresses to mobile terminals has now been introduced as one of the proposed schemes. In Internet Engineering Task Force (IETF) concerned with Mobile IP, many discussions are being held and have now reached a stage of Mobile IPv6 (MIPv6). Mobile IP is classified into Mobile IPv4 and Mobile IPv6 technologies according to version of IP.

The IP communication network, though it started based on IP version 4 (v4), is developing into an IPv6-based network, an advanced network, for limitation of available IP resources, an increase in the number of users, and provisioning of various services. The most noticeable characteristic of IPv6 is that a length of IP address is extended from 32 bits to 128 bits, in preparation for a possible depletion of network addresses due to the rapid growth of the Internet industry.

IPv6, as its header region is extended, is allowed to designate a mechanism for source authentication of packets, and guarantee of data integrity and security.

In data transmission, this Mobile IP communication network can provide data without a change in the existing IP and/or disconnection of the access. However, since the standard for Mobile IP technology has been completed and applied to the commercial products up to now, use of the conventional packet filter rule cannot guarantee smooth data communication.

FIG. 1 illustrates a configuration of a network system using Mobile IP, provided for a description of an authentication process based on a Care-of Test Init (CoTI) message in a conventional Mobile Node (MN).

An MN 170 indicates a terminal for performing data communication. A Correspondent Node (CN) 110 indicates a counterpart node with which the MN 170 performs data communication.

A packet filtering apparatus 120, or FireWall (FW), prevents further extension of security accident and/or intimidation of networks on the Internet and isolates the networks. That is, the packet filtering apparatus 120 prevents unauthorized traffic influx from the exterior and permits only the authorized and authenticated traffic in order to protect an internal network from unreliable external networks. The packet filtering apparatus 120, in which a packet filter rule is stored, can be an access router.

In Mobile IPv6, even though the mobile node 170 having a home address (also known as Home of Address (HoA)) assigned in a home link region leaves the home link region and moves to a remote link region, it can communicate with the desired correspondent node 110 using a Care-of Address (CoA) assigned in the remote link region.

There are two possible methods in which a mobile node performs data communication with a correspondent node in a Mobile IP communication network.

A first method is a tunneling method in which the mobile node passes through a Home Agent (HA) between the mobile node and the correspondent node.

In FIG. 1, the correspondent node 110 is protected by a network to which the packet filter rule of the packet filtering apparatus 120 is applied. For communication with the correspondent node 110, the mobile node 170 initially performs communication via an HA 160, and in this communication process, the packet filter rule is stored in the packet filtering apparatus 120. When the mobile node 170 communicates with the correspondent node 110, the packet filtering apparatus 120 sets a home address of a mobile node as a source IP address and sets an address of a correspondent node as a destination IP address by means of a downlink packet filter. The 'downlink' herein indicates a communication route from the mobile node to the correspondent node. An uplink indicates a communication route from the correspondent node to the mobile node.

A second method is a direct communication method in which for optimization of a route, the mobile node 170 and the correspondent node 110 directly communicate with each other without passing through the HA 160.

In order for the mobile node 170 and the correspondent node 110 to directly communicate with each other without passing through the HA 160, the mobile node 170 attempts to authenticate the correspondent node 110 through a return routability process. The authentication attempt process is initiated by the mobile node 170 by sending a CoTI message shown in FIG. 1 to the correspondent node 110. However, the CoTI message uses a CoA as a source address because the mobile node 170 having a home address assigned in the home link region has vacated the home link region and moved to the remote link region. Therefore, as shown in FIG. 1, a packet is dropped by the packet filter rule in the packet filtering apparatus 120 before it is transmitted to the correspondent node 110. In this case, a source address should be a home address assigned by the packet filter rule in the home link region, but because it is a CoA, the packet filtering apparatus 120 recognizes a sender of the packet as a hacker or an attacker.

That is, even though the return routability process has been introduced to perform authentication, because a CoTI message, one of a plurality of return routability messages, is filtered and dropped in the packet filtering apparatus 120, the corresponding network has a low security level and thus can be exposed to potential hacking.

FIG. 2 illustrates a configuration of a network system using Mobile IP, provided for a description of an authentication process based on a Home Test Init (HoTI) message in a conventional mobile node.

In the Mobile IP communication network, for communication with a correspondent node 110, a mobile node 170 initially performs communication via an HA 160, and in this communication process, a packet filter rule is stored in a packet filtering apparatus 120. When the mobile node 170 performs communication with the correspondent node 110, the packet filtering apparatus 120 sets a home address of the mobile node 170 as a source IP address and sets an address of the correspondent node 110 as a destination IP address by means of a packet filter, and sets a protocol type to Transmission Control Protocol (TCP) or User Datagram Protocol (UDP).

In the communication method via the HA 160, due to the unreasonable routing problem, the mobile node 170 may wish to directly communicate with the correspondent node 110. In this case, the mobile node 170 attempts authentication through a return routability process, and this process is initiated by the mobile node 170 by sending an HoTI message to the correspondent node 110 via the HA 160. Because the HoTI message is sent via the HA 160, the source address includes the home address, solving the problem in FIG. 1.

However, there is a function of checking a header type by means of the packet filter rule in the packet filtering apparatus 120, and because the header type is output from the IPv6 network, the packet filtering apparatus 120 actually recognizes the packet as an IPv6 packet. However, in the IPv6 network, because the protocol type is transmitted using a Mobility header, the HoTI message is dropped by the packet filter rule in the packet filtering apparatus 120 before it is transmitted to the correspondent node 110, as shown in FIG. 2. That is, when the Next header is a Mobility header in the current packet filter rule, the packet filtering apparatus 120 checks only the header type, so that it drops the packet as it has failed to read the Mobility header.

SUMMARY OF THE INVENTION

An aspect of the present invention is to address at least the problems and/or disadvantages and to provide at least the advantages described below. Accordingly, an aspect of the present invention is to provide a packet filtering apparatus and method for preventing a CoTI message and/or an HoTI message, an authentication message, from being dropped by a packet filter rule before being transmitted from a mobile node to a correspondent node in a network system using Mobile IP.

An aspect of the present invention is to provide a packet filtering apparatus and method for applying a packet filter rule taking a MIPv6 packet characteristic into account so as to prevent a CoTI message from being dropped when a correspondent node is in a network protected by a packet filtering apparatus, in sending the CoTI message by a mobile node in an authentication process such as a return routability process, in a network system using Mobile IP.

An aspect of the present invention is to provide a packet filtering apparatus and method for sending an appropriate authentication message to a correspondent node by setting a packet filter rule taking an MIPv6 packet into account, in a network system using Mobile IP.

An aspect of the present invention is to provide a packet filtering apparatus and method for sending an appropriate authentication message to a correspondent node by applying an MIPv6 packet rule to a packet filter rule in sending an HoTI message to the correspondent node via an HA by a mobile node in an authentication process such as a return routability process, in a network system using Mobile IP.

An aspect of the present invention is to provide a packet filtering apparatus and method for performing an appropriate authentication process between a mobile node and a correspondent node by allowing the mobile node to add information capable of passing a packet filter rule to a CoTI message before transmission and also allowing a packet filtering apparatus protecting the correspondent node to recognize the information capable of passing the packet filter rule when sending the CoTI message from the mobile node to the correspondent node, in a network system using Mobile IP.

According to the present invention, there is provided a network system using Mobile IP, including a mobile node for transmitting a packet including information capable of passing a packet filter rule, and a packet filtering apparatus for determining whether an address included in the information is identical to a source address stored in the packet filter rule, and whether to pass the packet according to the determination result.

According to the present invention, there is provided a packet filtering apparatus for filtering a packet transmitted from a mobile node to a correspondent node in a network system using Mobile IP, including a next header reader for reading a next header of the received packet to determine whether it is a mobility header, a mobility header type reader for reading a mobility header type when the next header is the mobility header, a mobility option reader for reading a mobility option added by the mobile node, and a packet rule applier for determining whether a home address included in the mobility option read by the mobility option reader is identical to a source address stored in a packet filter rule, and whether to pass the packet according to the determination result.

According to the present invention, there is provided a method for filtering a packet transmitted from a mobile node to a correspondent node in a network system using Mobile IP, including receiving from the mobile node a packet to which information capable of passing a packet filter rule is added, and determining whether an address included in the information is identical to a source address stored in the packet filter rule, and whether to pass the packet according to the determination result.

According to the present invention, there is provided a method for filtering a packet transmitted from a mobile node to a correspondent node in a network system using Mobile IP, including reading a next header of a received packet to determine whether it is a mobility header, reading a mobility header type when the next header is the mobility header, reading a mobility option added by the mobile node, and determining whether a home address included in the mobility option is identical to a source address stored in a packet filter rule, and whether to pass the packet according to the determination result.

According to the present invention, there is provided a network system using Mobile IP, including a mobile node for transmitting a packet including a mobility header, and a packet filtering apparatus for applying a rule for reading the mobility header to a packet filter rule, and reading the mobility header of the packet transmitted from the mobile node depending on the packet filter rule.

According to the present invention, there is provided a packet filtering apparatus for filtering a packet transmitted from a mobile node to a correspondent node in a network system using IP, including a next header reader for reading a next header of a received packet to determine whether it is a mobility header, a mobility header type reader for reading a mobility header type when the next header is the mobility header, and a packet rule applier for determining whether a type of the next header following the mobility header is coincident with the packet filter rule, and whether to pass the packet according to the determination result.

According to the present invention, there is provided a method for filtering a packet in a network system using Mobile IP, including receiving a packet including a mobility header from a mobile node, and applying a rule for reading the mobility header to a packet filter rule, and reading the mobility header of the packet transmitted from the mobile node depending on the packet filter rule.

According to the present invention, there is provided a packet filtering method for filtering a packet transmitted from a mobile node to a correspondent node in a network system using Mobile IP, including reading a next header of a received packet to determine whether it is a mobility header, reading a mobility header type when the next header is the mobility header, and determining whether a type of the next header following the mobility header is coincident with a packet filter rule, and whether to pass the packet according to the determination result.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness.

The first embodiment of the present invention performs an appropriate authentication process between a mobile node and a correspondent node by allowing the mobile node to add information capable of passing a packet filter rule to a CoTI message, one of a plurality of authentication messages, before transmission when the correspondent node is in a network protected by the packet filtering apparatus, and also allowing the packet filtering apparatus protecting the correspondent node to recognize the information capable of passing the packet filter rule in an authentication process such as a return routability process.

The second embodiment of the present invention performs an appropriate authentication process during direct communication between a mobile node and a correspondent node by applying a characteristic of an MIPv6 packet to a packet filter rule, for an HoTI message being sent from the mobile node to the correspondent node via an HA in an authentication process such as a return routability process.

The correspondent node described below indicates a node that can communicate with other nodes, and the correspondent node is not limited to a particular node, but can include every node using Mobile IP. In the following description, it should be noted that the correspondent node has the foregoing meaning. Further, a network system using Mobile IP is assumed herein as a network system using MIPv6, for the sake of convenience.

Figure 1:
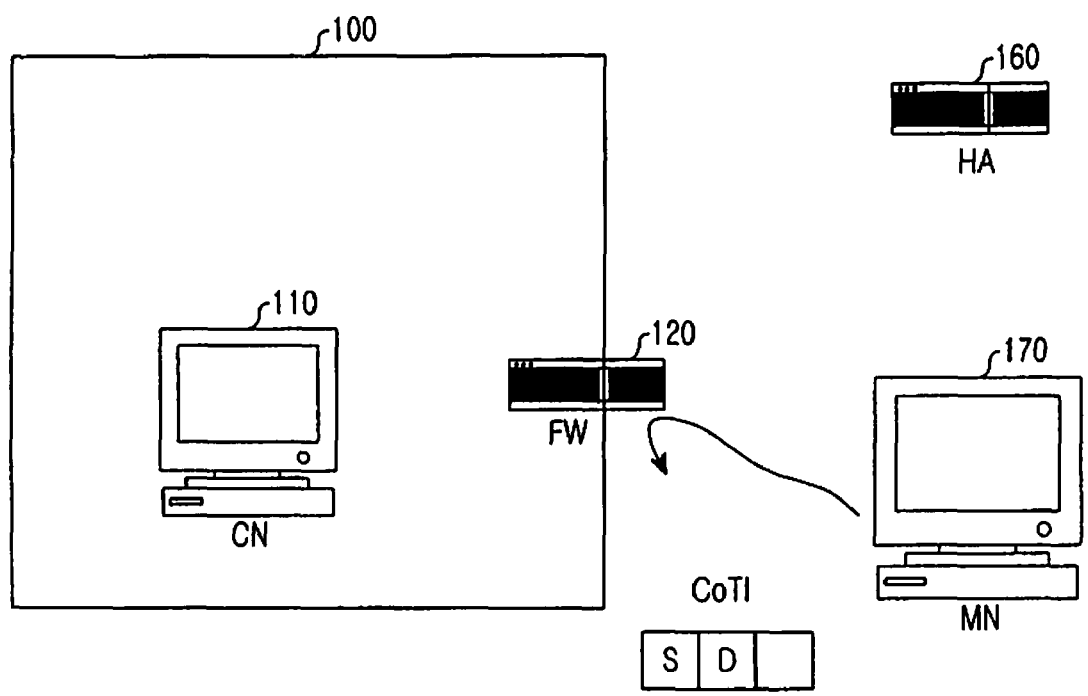
FIG. 1 illustrates a configuration of a network system using Mobile IP, provided for a description of an authentication process based on a CoTI message in a conventional mobile node.
Figure 2:
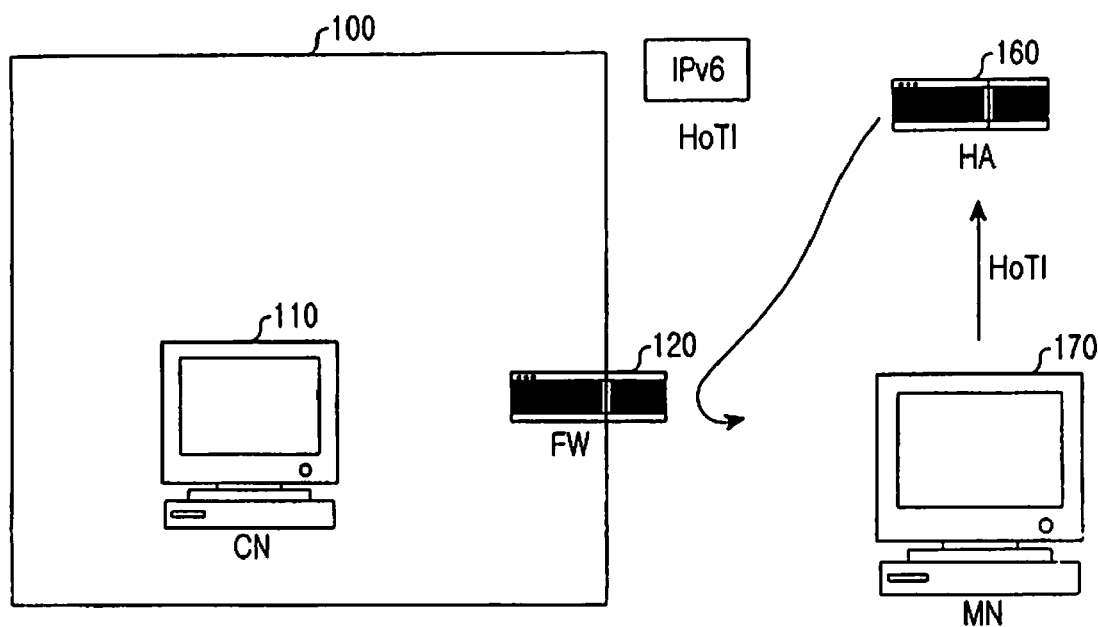
FIG. 2 illustrates a configuration of a network system using Mobile IP, provided for a description of an authentication process based on an HoTI message in a conventional mobile node.
Figure 3:
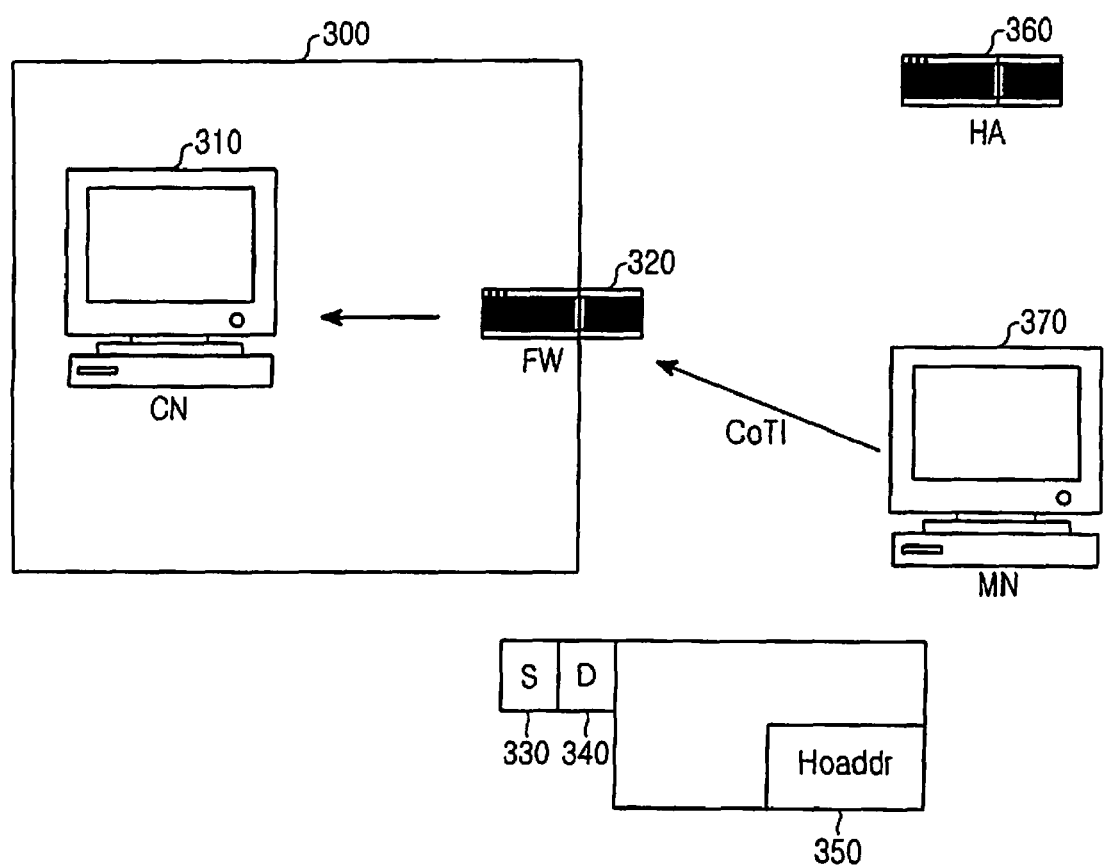
FIG. 3 illustrates a configuration of a network system using Mobile IP according to a first embodiment of the present invention.

FIG. 3 illustrates a configuration of a network system using Mobile IP according to a first embodiment of the present invention. With reference to FIG. 3, a description will now be made of a packet filtering operation in a packet filtering apparatus according to a first embodiment of the present invention.

A correspondent node 310 is protected by a network 300 to which a packet filter rule of a packet filtering apparatus 320 is applied. The correspondent node 310 and a mobile node 370 can perform communication via an HA 360, but they need to optimize the route by directly communicating with each other because of a decrease in the communication efficiency. When the route is optimized by allowing direct communication between the correspondent node 310 and the mobile node 370 using the current standard, there is a need for a procedure in which the mobile node 370 is registered in the correspondent node 310. To perform this registration procedure, there is a need for a process in which the correspondent node 310 authenticates the mobile node 370.

In the present invention, to prevent a CoTI message from being dropped by the packet filter rule before being transmitted to the correspondent node, the mobile node 370 adds a mobility option to the conventional CoTI message and sends its own home address 350 together with the CoTI message, as shown in FIG. 3. The packet filtering apparatus 320 can recognize this information using the packet filter rule.

Figure 4:
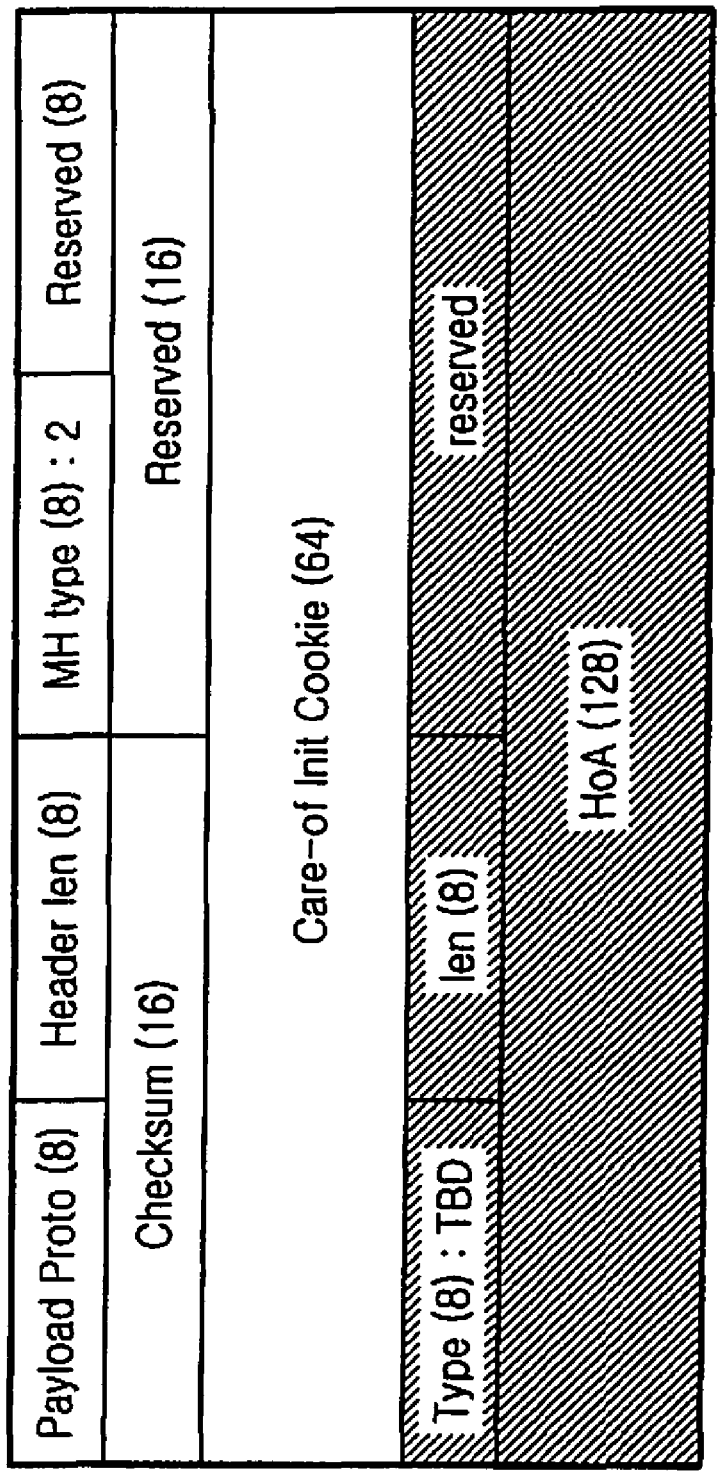
FIG. 4 illustrates a structure of a CoTI message transmitted in the first embodiment of the present invention.

FIG. 4 illustrates a structure of a CoTI message transmitted in the first embodiment of the present invention.

A size of each field is indicated in the number of bits in a parenthesis following a corresponding field name of the message of FIG. 4.

Regarding the message fields of FIG. 4, a "Payload Proto" field indicates a type of a Next header following a Mobility header.

A "Header Len" field, an 8-bit unsigned integer, indicates a length of the Mobility header in units of 8 octets, and the first 8 octets are excluded.

An Mobility Header "MH Type" field is used for distinguishing a mobility message. "MH type(8):2" is written in this message field of FIG. 4, and "2" indicates that the corresponding message is a CoTI message.

A "Reserved" field is a region reserved for future use.

A "Checksum" field, a 16-bit unsigned integer, indicates a checksum of a Mobility header.

A "Care-of Init Cookie" field is a random number that a mobile node sends when it transmits a CoTI message to a correspondent node.

In the first embodiment of the present invention, information capable of passing the firewall or another packet filtering apparatus, compared to the existing CoTI message, is included after the Mobility header. The corresponding information is written in the hatched part of FIG. 4.

An option type, as it is determined by the standard group, is denoted as To Be Determined (TBD) in the present invention. Fields added to the message include an 8-bit 'len' field indicating a length of the option, a 16-bit 'reserved' field left for future use, and a 128-bit HoA field indicating a home address of a mobile node.

Figure 5:
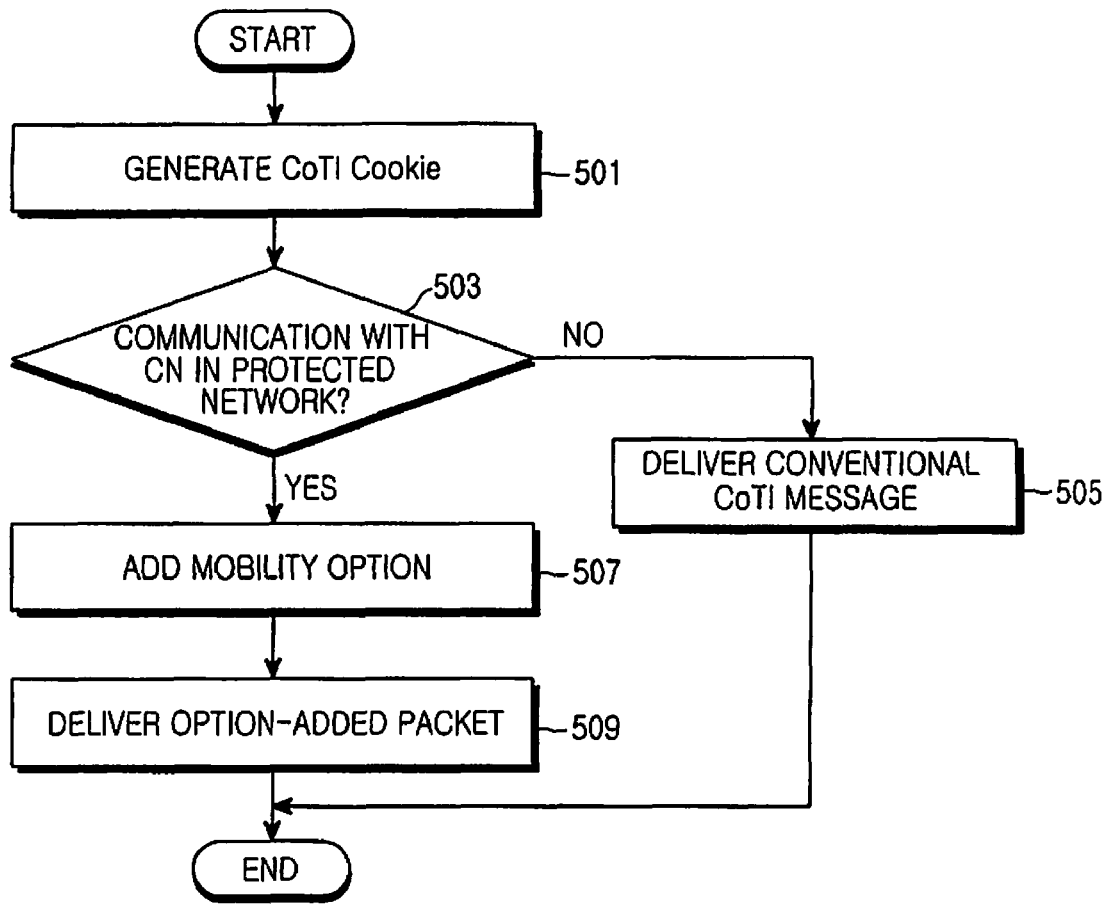
FIG. 5 is a flowchart illustrating an operation of a mobile node for sending a CoTI message according to the first embodiment of the present invention.

If a mobile node 370 generates and sends the CoTI message as shown in FIG. 5, even though a correspondent node 310 in communication with the mobile node 370 is in a protected network 300, a packet filter rule in a packet filtering apparatus 320 can recognize it, so that an authentication procedure between the mobile node 370 and the correspondent node 310 is possible.

FIG. 5 illustrates an operation of a mobile node for sending a CoTI message according to the first embodiment of the present invention. With reference to FIG. 5, a description will now be made of an operation of a mobile node for allowing a CoTI message to pass a packet filter rule of a packet filtering apparatus when a correspondent node is in a protected network.

In step 501, a mobile node 370 generates a CoTI Cookie to be included in a CoTI message.

In step 503, the mobile node 370 determines whether it will communicate with a correspondent node 310 in a protected network 300.

If the mobile node 370 determines not to communicate with the correspondent node 310 in the protected network 300, the mobile node 370 generates and sends a conventional CoTI message in step 505.

However, if mobile node 370 determines to communicate with the correspondent node 310 in the protected network 300, the mobile node 370 adds a mobility option, a hatched part in FIG. 4, to the CoTI message in step 507. Thereafter, in step 509, the mobile node 370 transmits the mobility option-added packet.

Figure 6:
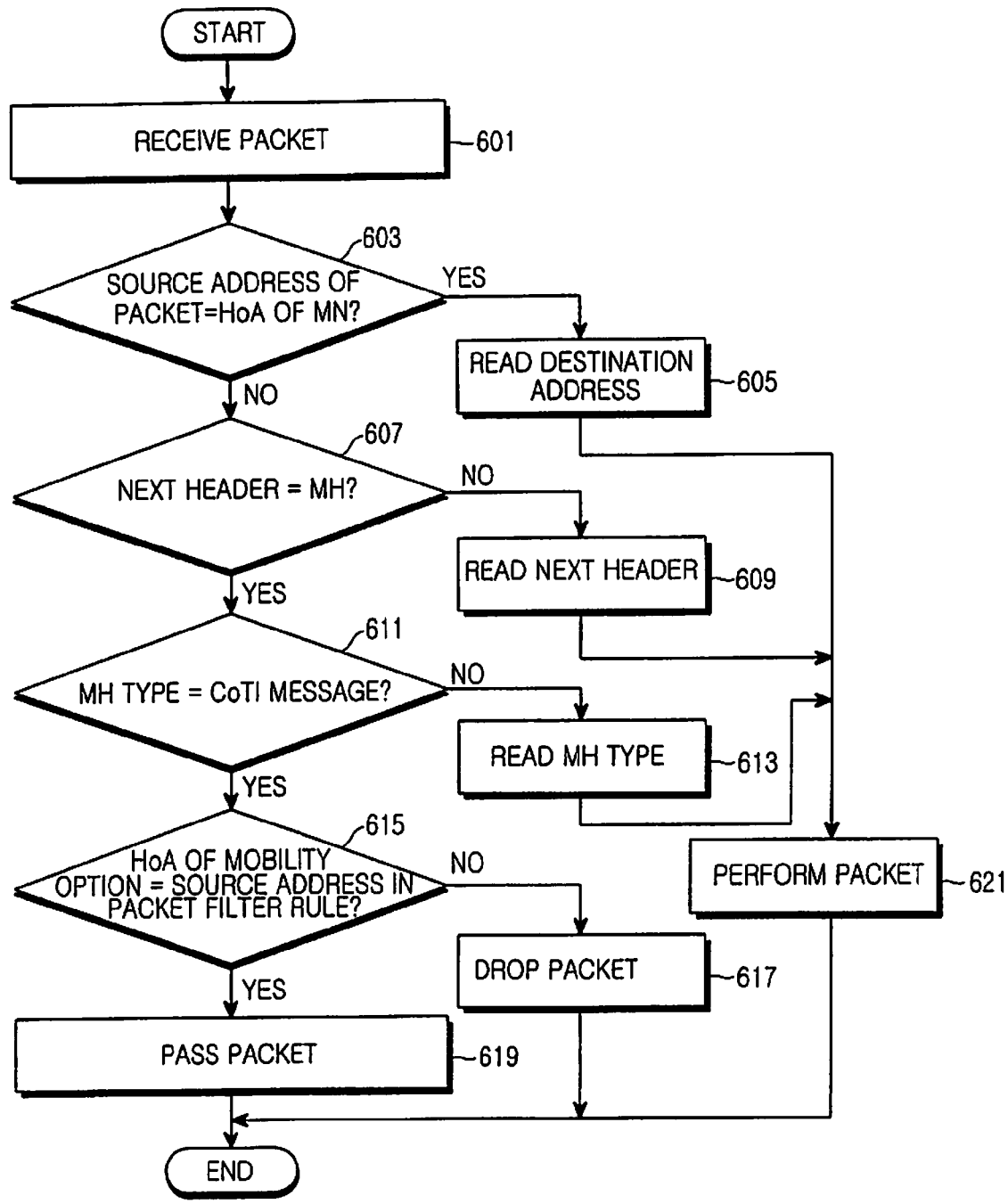
FIG. 6 is a flowchart illustrating a packet filtering operation for enabling authentication using a CoTI message in a packet filtering apparatus of a network system using Mobile IP according to the first embodiment of the present invention.

FIG. 6 illustrates a packet filtering operation for enabling authentication using a CoTI message in a packet filtering apparatus of a network system using Mobile IP according to the first embodiment of the present invention.

In step 601, a packet filtering apparatus 320 receives a packet from a mobile node 370. Upon receipt of the packet, the packet filtering apparatus 320 applies a packet filter rule by parsing a packet header region such as IP, UDP and TCP.

Thereafter, the packet filtering apparatus 320 determines in step 603 whether a source address of the received packet is a home address of the mobile node 370.

If the source address of the received packet is the home address of the mobile node 370, the packet filtering apparatus 320 reads a destination address in step 605. After reading the destination address, the packet filtering apparatus 320 performs a packet filtering process in step 621.

However, if the source address of the received packet is not the home address of the mobile node 370, the packet filtering apparatus 320, though it drops the packet in the prior art, proceeds to step 607 in the first embodiment of the present invention, and determines whether a Next header is a Mobility header.

If the Next header is not the Mobility header, the packet filtering apparatus 320 reads the Next header in step 609.

After reading the Next header, the packet filtering apparatus 320 performs a packet filtering process in step 621.

However, if the Next header is the Mobility header, the packet filtering apparatus 320 determines in step 611 whether an MH type is a CoTI message. The packet filtering apparatus 320 determines that the MH type is the CoTI message, if "MH type(8):2" is written in the message of FIG. 4.

If the MH type is not the CoTI message, the packet filtering apparatus 320 reads the MH type in step 613. After reading the MH type, the packet filtering apparatus 320 performs a packet filtering process in step 621.

However, if the MH type is the CoTI message, the packet filtering apparatus 320 reads in step 615 a home address of a mobility option and determines whether the home address of the mobility option is a source address of the packet filter rule. That is, the packet filtering apparatus 320 determines whether the home address of the mobility option is identical to the source address of the packet filter rule.

If the home address of the mobility option is not the source address of the packet filter rule, i.e. if the home address of the mobility option is not identical to the source address of the packet filter rule, the packet filtering apparatus 320 drops the packet in step 617.

However, if the home address of the mobility option is the source address of the packet filter rule, i.e. if the home address of the mobility option is identical to the source address of the packet filter rule, the packet filtering apparatus 320 passes the packet in step 619.

Figure 7:
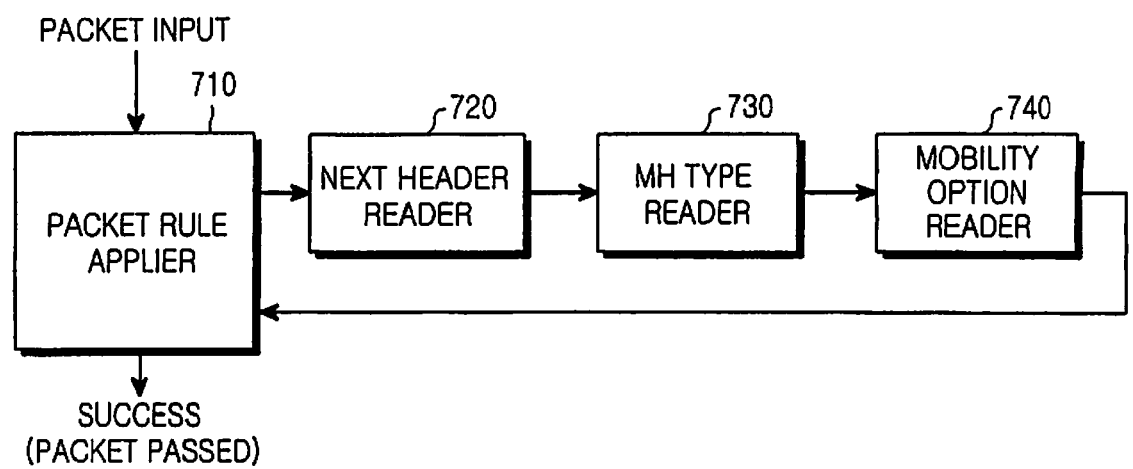
FIG. 7 illustrates a structure of a packet filtering apparatus in a network system using Mobile IP according to the first embodiment of the present invention.

FIG. 7 illustrates a structure of a packet filtering apparatus in a network system using Mobile IP according to the first embodiment of the present invention.

Referring to FIG. 7, a packet filtering apparatus 320 according to the first embodiment of the present invention includes a packet rule applier 710, a next header reader 720, an MH type reader 730 and a mobility option reader 740.

The packet (filter) rule applier 710, upon receipt of a packet transmitted from a correspondent node 310, delivers the received packet to the next header reader 720, which reads a Next header of the received packet.

If the Next header of the received packet is a Mobility header, the MH type reader 730 reads MH type and determines that the corresponding message is a CoTI message.

The mobility option reader 740 reads a mobility option added to the CoTI message by a mobile node 370, and then provides the reading result to the packet rule applier 710.

The packet rule applier 710 determines whether a home address of the mobility option read by the mobility option reader 740 is identical to a source address. If the home address of the read mobility option is not identical to the source address, the packet rule applier 710 drops the packet. Otherwise, the packet rule applier 710 passes the packet.

Figure 8:
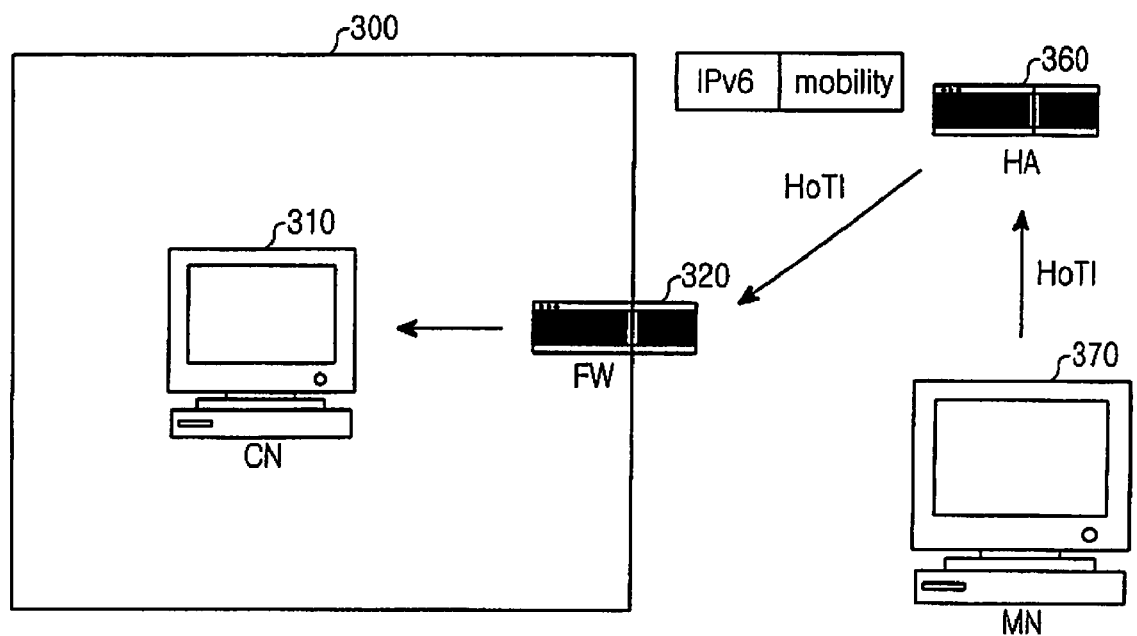
FIG. 8 illustrates a configuration of a network system using Mobile IP according to a second embodiment of the present invention.

FIG. 8 illustrates a configuration of a network system using Mobile IP according to a second embodiment of the present invention.

In FIG. 8, a correspondent node 310 is protected by a network 300 to which a packet filter rule of a packet filtering apparatus 320 is applied. The correspondent node 310 and a mobile node 370 can perform communication via an HA 360, but they need to optimize the route by directly communicating with each other because of a decrease in the communication efficiency. When the route is optimized by allowing direct communication between the correspondent node 310 and the mobile node 370 using the current standard, there is a need for a procedure in which the mobile node 370 is registered in the correspondent node 310. To perform this registration procedure, there is a need for a process in which the correspondent node 310 authenticates the mobile node 370.

The present invention, as shown in FIG. 8, sends an HoTI message in the authentication process using a tunneling technique as done in the prior art. In this case, the present invention sends the HoTI message by applying, as a packet filter rule for reading it, a rule for reading a Mobility header, or a unique header format of MIPv6.

Figure 9:
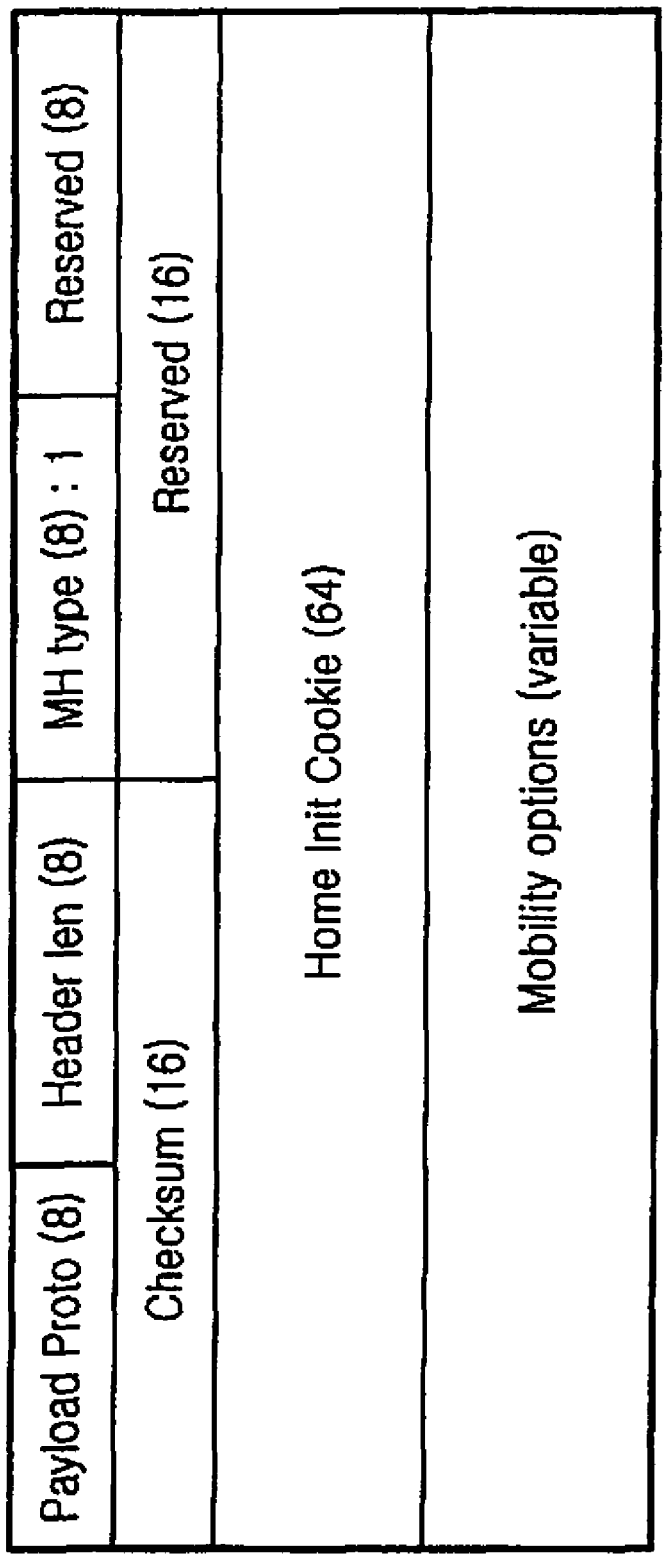
FIG. 9 illustrates a structure of an HoTI message transmitted in the second embodiment of the present invention.

FIG. 9 illustrates a structure of an HoTI message transmitted in the second embodiment of the present invention.

A size of each field is indicated in the number of bits in parentheses following a corresponding field name of the message of FIG. 9, and the HoTI message starts with a Mobility header and includes a "Home Init Cookie" field.

Regarding the message fields of FIG. 9, a "Payload Proto" field indicates a type of a Next header following a Mobility header.

A "Header Len" field, an 8-bit unsigned integer, indicates a length the Mobility header in units of 8 octets, and the first 8 octets are excluded.

An "MH Type" field used for distinguishing a mobility message. "MH type(8):1" is written in this message field of FIG. 9, and "1" indicates that the corresponding message is an HoTI message.

A "Reserved" field, an 8-bit field, is a region reserved for future use.

A "Checksum" field, a 16-bit unsigned integer, indicates a checksum of a Mobility header.

An "Home Init Cookie" field is a random number that a mobile node sends when it transmits an HoTI message to a correspondent node.

A mobility option has a variable length, and the current standard designates no particular option.

Figure 10:
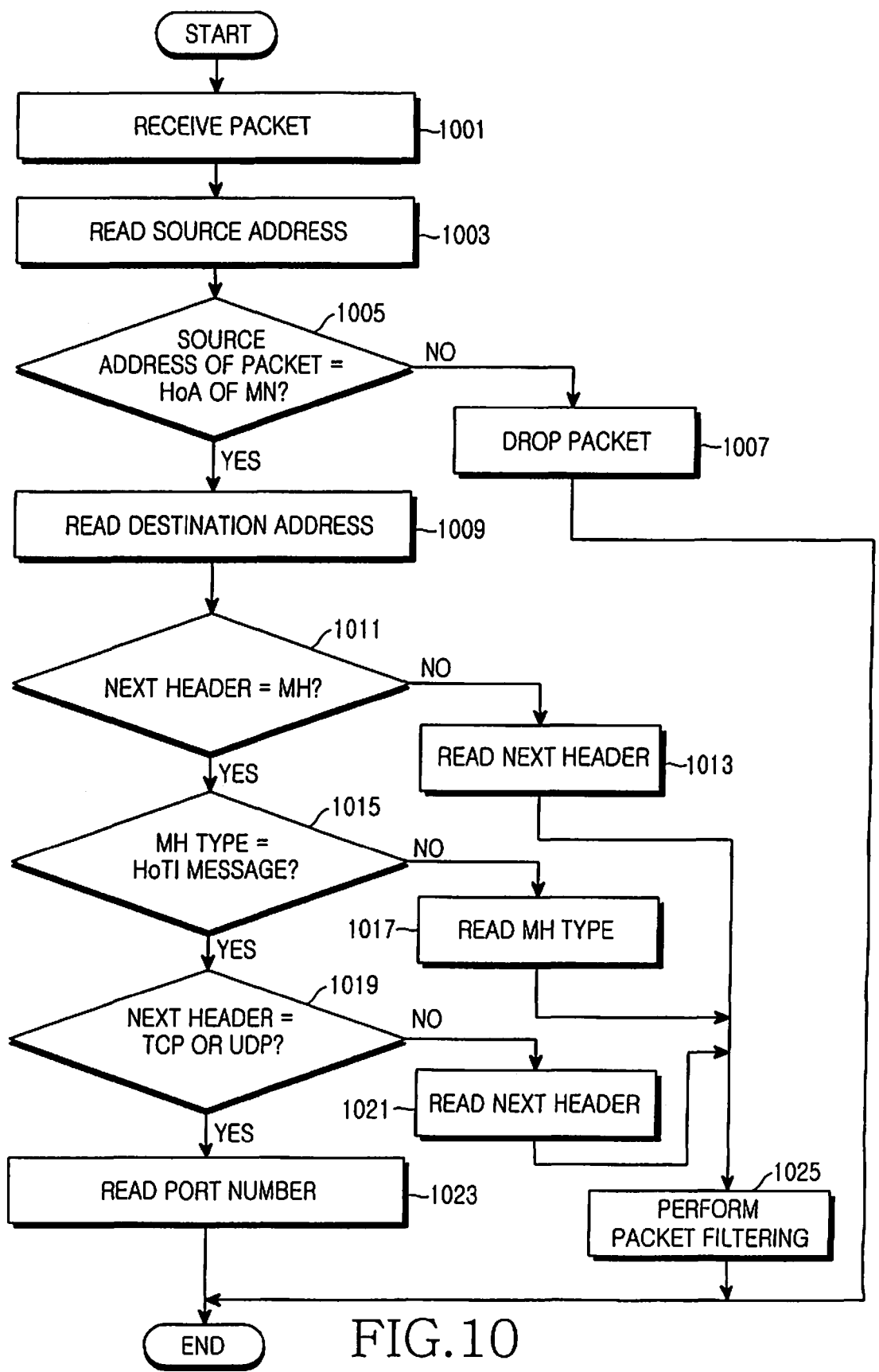
FIG. 10 is a flowchart illustrating a packet filtering operation for enabling authentication using an HoTI message in a network system using Mobile IP according to the second embodiment of the present invention.

FIG. 10 is a flowchart illustrating a packet filtering operation for enabling authentication using an HoTI message in a network system using Mobile IP according to the second embodiment of the present invention. With reference to FIG. 10, a description will now be made of a method for passing a packet filter rule when a Next header is a Mobility header in the second embodiment of the present invention in order to solve the problem that the current packet filter rule drops the Mobility header as it fails to read the Mobility header when the Next header is the Mobility header.

In step 1001, a packet filtering apparatus 320 receives a packet from a mobile node 370. Upon receipt of the packet, the packet filtering apparatus 320 applies a packet filter rule by parsing a packet header region such as IP, UDP and TCP.

Thereafter, in step 1003, the packet filtering apparatus 320 reads a source address of the received packet.

The packet filtering apparatus 320 determines in step 1005 whether the source address of the received packet is a home address of a mobile node.

If the source address of the received packet is not the home address of the mobile node, the packet filtering apparatus 320 drops the packet in step 1007.

However, if the source address of the received packet is the home address of the mobile node, the packet filtering apparatus 320 reads a destination address in step 1009.

Thereafter, the packet filtering apparatus 320 determines in step 1011 whether a Next header is a Mobility header. That is, the packet filtering apparatus 320 determines whether a Next header value is a predetermined value, for example, 135. Although the second embodiment of the present invention will be described herein with reference to the HoTI message, by way of example, to solve the problem that the packet filtering apparatus drops a message with a Mobility header as it fails to recognize a Mobility header, this concept can also be applied to when other messages except for the HoTI message with a Mobility header are dropped by the packet filter rule.

That is, as another example, even for the message with a Mobility header, such as a binding refresh request message with an MH type value=0 (an update request for binding data), a CoTI message with an MH type value=2 (a message used for checking an authentication value together with a Care-of Test (CoT) message in an authentication process), a Home Test (HoT) message with an MH type value=3 (a message used for checking an authentication value together with an HoTI message during an authentication process), a CoT message with an MH type value=4 (a message used for checking an authentication value together with a CoTI message during authentication), a Binding Update (BU) message with an MH type value=5 (a message used for registration request), a Binding Acknowledgement (BA) message with an MH type value=6 (a response message to the registration request), and a Binding Error message with an MH type value=7 (a message indicating occurrence of an error, if any, in response to the registration request), because a value of the Next header field is 135, the determination process of step 1011 and its following process can be applied.

If it is determined in step 1011 that the Next header is not the Mobility header, the packet filtering apparatus 320 reads the Next header in step 1013. After reading the Next header, the packet filtering apparatus 320 performs a packet filtering process in step 1025.

However, if the Next header is the Mobility header, the packet filtering apparatus 320 determines in step 1015 whether an MH type is an HoTI message. The packet filtering apparatus 320 determines that the MH type is the HoTI message, if "MH type(8):1" is written in the message of FIG. 9.

If the MH type is not the HoTI message, the packet filtering apparatus 320 reads the MH type in step 1017. After reading the MH type, the packet filtering apparatus 320 performs a packet filtering process in step 1025.

Although a description has been made of the HoTI message, for other messages with an MH type vale=0 and 2 to 7, the determination algorithm can be applied according to the message type as described above. As another example, if an MH type vale is 2, indicating a CoTI message, and a source address and a destination address have passed the packet filter rule, the packet filtering apparatus 320 determines in step 1011 that the Next header is the Mobility header and determines in step 1015 that the corresponding message is a CoTI message among the messages with a Mobility header. Thereafter, in step 1019, the packet filtering apparatus 320 can determine a value of a Payload Proto field.

Although the process of steps 1015 and 1017 is shown herein because the present invention has been described in detail with reference to the HoTI message, the packet filtering apparatus 320 can directly proceed to step 1019 after determining in step 1011 whether the Next header is the Mobility header. That is, if there is no need to determine in step 1015 whether the mobility header type is different, the packet filtering apparatus 320 can proceed to step 1019 after step 1011 without determining the mobility header type.

However, if the MH type is the HoTI message, the packet filtering apparatus 320 determines in step 1019 whether the Next header is TCP or UDP, wherein a value included in a Payload Proto field in the Mobility header shown in the format of the HoTI message of FIG. 9 is 6 for the TCP and 17 for the UDP.

If the value of the Payload Proto field indicates none of the TCP and UDP, the packet filtering apparatus 320 reads the Next header depending on the value of the Payload Proto field in step 1021. After reading the Next header, the packet filtering apparatus 320 performs a packet filtering process in step 1025. However, if the value of the Payload Proto field is at least one of the TCP and UDP, the packet filtering apparatus 320 reads port numbers of a source and a destination in step 1023.

Figure 11:
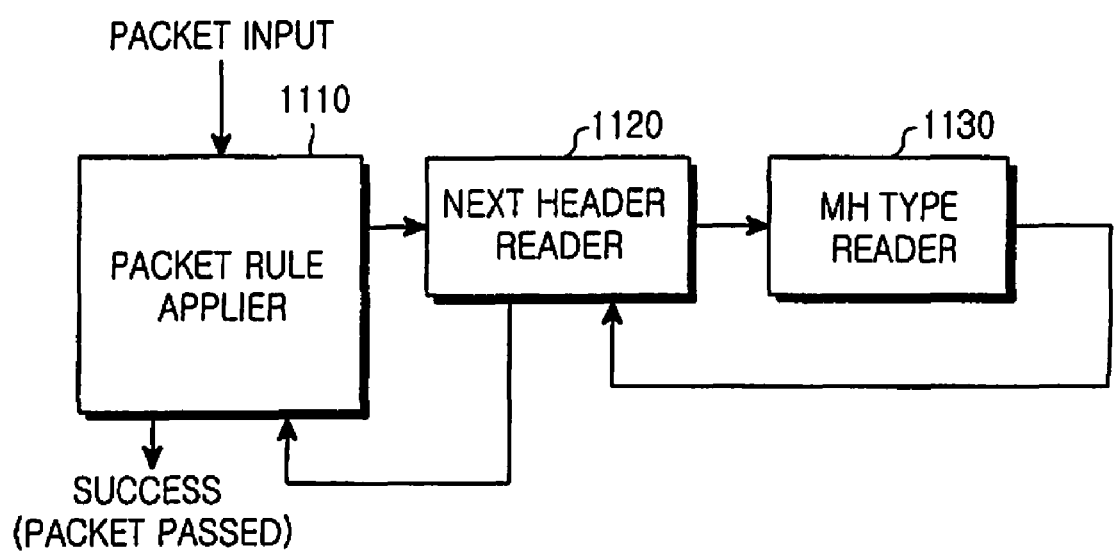
FIG. 11 illustrates a structure of a packet filtering apparatus in a network system using Mobile IP according to the second embodiment of the present invention.

FIG. 11 illustrates a structure of a packet filtering apparatus in a network system using Mobile IP according to the second embodiment of the present invention.

Referring to FIG. 11, a packet filtering apparatus 320 according to the second embodiment of the present invention includes a packet rule applier 1110, a next header reader 1120 and an MH type reader 1130.

The packet (filter) rule applier 1110, upon receipt of a packet transmitted from a correspondent node 310, delivers the received packet to the next header reader 1120.

The next header reader 1120 reads a Next header of the received packet. After reading the Mobility header, the next header reader 1120 provides the reading result to the MH type reader 1130.

The MH type reader 1130 determines an HoTI message depending on the MH type, and provides this information to the next header reader 1120. The next header reader 1120 reads not only the Mobility header read by the MH type reader 1130, but also the header such as TCP and UDP. The next header reader 1120 reads the Next header of the message set as an HoTI message, and provides the reading result to the packet rule applier 1110.

The packet rule applier 1110 determines whether the protocol type is identical to the packet filter rule, and passes the packet if the protocol type is identical to the packet filter rule. Otherwise, if the protocol type is not identical to the packet filter rule, the packet rule applier 1110 drops the packet. That is, if the Next header value of the message set as an HoTI message is one of the TCP and UDP, the packet rule applier 1110 reads port numbers for application of the next packet filter rule in order to pass the packet. However, if the Next header value is none of the TCP and UDP, the packet rule applier 1110 sends it to the next header reader 1120 to read the Next header.

As is apparent from the foregoing description, the present invention can prevent a CoTI message and/or an HoTI message from being dropped by a packet filter rule before being transmitted from a mobile node to a correspondent node.

In addition, the present invention can apply a packet filter rule taking a MIPv6 packet characteristic into account so as to prevent a CoTI message from being dropped when a correspondent node is in a network protected by a packet filtering apparatus, in sending the CoTI message by a mobile node in an authentication process such as a return routability process.

Further, the present invention can send an appropriate authentication message to a correspondent node by setting a packet filter rule taking a MIPv6 packet into account.

In addition, the present invention can send an appropriate authentication message to a correspondent node by applying an MIPv6 packet rule to a packet filter rule in sending an HoTI message to the correspondent node via an HA by a mobile node in an authentication process such as a return routability process.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A network system using Mobile Internet Protocol (IP), the system comprising:
   a mobile node for transmitting a packet including information indicating that the packet is capable of passing a packet filter rule; and
   a packet filtering apparatus for determining whether an address included in the information is identical to a source address stored in the packet filter rule, and determining whether to pass the packet according to a result of the determination,
   wherein the packet filtering apparatus comprises:
   a next header reader for reading a next header of the received packet to determine whether it is a mobility header;
   a mobility header type reader for reading a mobility header type when the next header is the mobility header;
   a mobility option reader for reading a mobility option added by the mobile node; and
   a packet rule applier for determining whether a home address included in the mobility option read by the mobility option reader is identical to a source address stored in the packet filter rule, and determining whether to pass the packet according to a result of the determination from packet rule applier.

2. The network system of claim 1, wherein the information indicating that the packet is capable of passing the packet filter rule includes a home address of the mobile node.

3. The network system of claim 1, wherein the packet includes a Care-of Test Init (CoTI) message.

4. The network system of claim 3, wherein the information indicating that the packet is capable of passing the packet filter rule is information obtained by adding a mobility option to the CoTI message.

5. The network system of claim 1, wherein the mobility option reader determines identity of a Care-of Test Init (CoTI) message depending on the mobility header type.

6. The network system of claim 1, wherein the packet filtering apparatus passes the packet when the address included in the information is identical to the source address stored in the packet filter rule.

7. The network system of claim 1, wherein the packet filtering apparatus drops the packet when the address included in the information is not identical to the source address stored in the packet filter rule.

8. A packet filtering apparatus for filtering a packet transmitted from a mobile node to a correspondent node in a network system using Mobile Internet Protocol (IP), the apparatus comprising:
   a next header reader for reading a next header of the received packet to determine whether it is a mobility header;
   a mobility header type reader for reading a mobility header type when the next header is the mobility header;
   a mobility option reader for reading a mobility option added by the mobile node; and
   a packet rule applier for determining whether a home address included in the mobility option read by the mobility option reader is identical to a source address stored in a packet filter rule, and determining whether to pass the packet according to a result of the determination from the packet rule applier.

9. The packet filtering apparatus of claim 8, wherein the mobility header type reader determines identity of a Care-of Test Init (CoTI) message depending on the mobility header type.

10. The packet filtering apparatus of claim 8, wherein the packet rule applier passes the packet when the home address included in the mobility option is identical to the source address stored in the packet filter rule.

11. The packet filtering apparatus of claim 8, wherein the packet rule applier drops the packet when the home address included in the mobility option is not identical to the source address stored in the packet filter rule.

12. A method for filtering a packet transmitted from a mobile node to a correspondent node in a network system using Mobile Internet Protocol (IP), the method comprising:
  receiving from the mobile node a packet to which information indicating that the packet is capable of passing a packet filter rule is added; and
  determining whether an address included in the information is identical to a source address stored in the packet filter rule, and determining whether to pass the packet according to a result of the determination,
  wherein the determining whether to pass the packet further comprises:
  reading a next header of the received packet to determine whether it is a mobility header;
  reading a mobility header type when the next header is the mobility header;
  reading a mobility option added by the mobile node; and
  determining whether a home address included in the mobility option is identical to a source address stored in the packet filter rule, and determining whether to pass the packet according to a result of the determination of whether the home address is identical to the source address.

13. The method of claim 12, wherein the information indicating that the packet is capable of passing the packet filter rule includes a home address of the mobile node.

14. The method of claim 12, wherein the packet includes a Care-of Test Init (CoTI) message.

15. The method of claim 14, wherein the information indicating that the packet is capable of passing the packet filter rule is information obtained by adding a mobility option to the CoTI message.

16. The method of claim 12, wherein the reading of the mobility header type further comprises determining identity of a Care-of Test Init (CoTI) message depending on the mobility header type.

17. The method of claim 12, further comprising:
  passing the packet when the address included in the information is identical to the source address stored in the packet filter rule.

18. The method of claim 12, further comprising:
  dropping the packet when the address included in the information is not identical to the source address stored in the packet filter rule.

19. A network system using Mobile Internet Protocol (IP), the system comprising:
  a mobile node for transmitting a packet including a mobility header; and
  a packet filtering apparatus for applying a rule for reading the mobility header to a packet filter rule, and reading the mobility header of the packet transmitted from the mobile node depending on the packet filter rule,
  wherein the packet filtering apparatus comprises:
  a next header reader for reading a next header of the received packet to determine whether it is a mobility header;
  a mobility header type reader for reading a mobility header type when the next header is the mobility header; and
  a packet rule applier for determining whether a type of the next header following the mobility header is coincident with the packet filter rule, and determining whether to pass the packet according to a result of the determination of whether the next header type is coincident with the packet filter rule.

20. The network system of claim 19, wherein the mobility header type reader further reads the type of the next header following the mobility header to determine whether it is at least one of a Transmission Control Protocol (TCP) and a User Datagram Protocol (UDP), when the mobility header type is set to a Home Test Init (HoTI) message.

21. The network system of claim 19, wherein the packet includes a message with a mobility header.

22. The network system of claim 19, wherein the packet rule applier passes the packet when the type of the next header following the mobility header is coincident with the packet filter rule.

23. The network system of claim 19, wherein the packet rule applier drops the packet when the type of the next header following the mobility header is not coincident with the packet filter rule.

24. A packet filtering apparatus for filtering a packet transmitted from a mobile node to a correspondent node in a network system using Mobile Internet Protocol (IP), the apparatus comprising:
  a next header reader for reading a next header of a received packet to determine whether it is a mobility header;
  a mobility header type reader for reading a mobility header type when the next header is the mobility header; and
  a packet rule applier for determining whether a type of the next header following the mobility header is coincident with the packet filter rule, and determining whether to pass the packet according to a result of the determination whether the next header type is coincident with the packet filter rule.

25. The packet filtering apparatus of claim 24, wherein the mobility header type reader further reads the type of the next header following the mobility header to determine whether it is at least one of a Transmission Control Protocol (TCP) and a User Datagram Protocol (UDP), when the mobility header type is set to a Home Test Init (HoTI) message.

26. The packet filtering apparatus of claim 24, wherein the packet includes a message with a mobility header.

27. A method for filtering a packet in a network system using Mobile Internet Protocol (IP), the method comprising:
  receiving a packet including a mobility header from a mobile node; and
  applying a rule for reading the mobility header to a packet filter rule, and reading the mobility header of the packet transmitted from the mobile node depending on the packet filter rule,
  wherein the reading of the mobility header comprises:
  reading a next header of the received packet to determine whether it is a mobility header;
  reading a mobility header type when the next header is the mobility header; and
  determining whether a type of the next header following the mobility header is coincident with the packet filter rule, and determining whether to pass the packet according to a result of the determination whether the next header type is coincident with the packet filter rule.

28. The method of claim 27, further comprising:
  reading the type of the next header following the mobility header to determine whether it is at least one of a Transmission Control Protocol (TCP) and a User Datagram Protocol (UDP), when the mobility header type is set to a Home Test Init (HoTI) message.

29. The method of claim 27, wherein the packet includes a message with a mobility header.

30. The method of claim 27, further comprising:
passing the packet when the type of the next header following the mobility header is coincident with the packet filter rule.

31. The method of claim 27, further comprising:
dropping the packet when the type of the next header following the mobility header is not coincident with the packet filter rule.

* * * * *